United States Patent
Speidel et al.

(10) Patent No.: US 10,636,407 B2
(45) Date of Patent: Apr. 28, 2020

(54) METHOD FOR MASKING AND/OR REDUCING DISTURBING NOISES OR THE CONSPICUOUSNESS THEREOF DURING OPERATION OF A MOTOR VEHICLE

(71) Applicant: Robert Bosch Automotive Engineering GmbH, Schwäbisch Gmünd (DE)

(72) Inventors: Gerd Speidel, Winterbach (DE); Michael Sturm, Staufen (DE); Thomas Alber, Filderstadt (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 45 days.

(21) Appl. No.: 16/063,487

(22) PCT Filed: Dec. 1, 2016

(86) PCT No.: PCT/EP2016/079367
§ 371 (c)(1),
(2) Date: Sep. 28, 2018

(87) PCT Pub. No.: WO2017/102342
PCT Pub. Date: Jun. 22, 2017

(65) Prior Publication Data
US 2019/0066653 A1 Feb. 28, 2019

(30) Foreign Application Priority Data
Dec. 18, 2015 (DE) .................. 10 2015 122 194

(51) Int. Cl.
*G10K 11/16* (2006.01)
*H03B 29/00* (2006.01)
(Continued)

(52) U.S. Cl.
CPC ........ *G10K 11/17823* (2018.01); *B62D 5/046* (2013.01); *B62D 5/0463* (2013.01);
(Continued)

(58) Field of Classification Search
CPC ......... H04R 2499/13; G10K 11/17823; G10K 11/17825; G10K 11/17883;
(Continued)

(56) References Cited

U.S. PATENT DOCUMENTS

| 5,629,986 A | 5/1997 | Shoureshi |
| 6,912,454 B2 * | 6/2005 | Astorino ............ G10K 11/1788 307/10.1 |

(Continued)

FOREIGN PATENT DOCUMENTS

| DE | 195 31 402 A1 | 2/1997 |
| DE | 197 49 587 C1 | 6/1999 |

(Continued)

OTHER PUBLICATIONS

International Search Report corresponding to PCT Application No. PCT/EP2016/079367, dated Feb. 3, 2017 (German and English language document) (7 pages).

*Primary Examiner* — Xu Mei
(74) *Attorney, Agent, or Firm* — Maginot, Moore & Beck LLP

(57) ABSTRACT

A method for masking and/or reducing disturbing noises or the conspicuousness thereof when a motor vehicle is being operated includes forming a compensation signal and/or a heterodyne signal based on disturbing noises that are detected in acceleration measurement signals that are received or based on operating states of the motor vehicle or at least of a component of the motor vehicle and using the compensation signal and/or heterodyne signal to modulate an existing control signal of an actuator of the motor vehicle (Continued)

such that the disturbing noises or conspicuousness thereof are reduced and/or at least in part masked. The method further includes influencing the heterodyne signal with a broadband signal or a tonal signal having the predetermined frequencies or arrangements such that the disturbing noises is masked or the conspicuousness of the disturbing noises are reduced.

15 Claims, 1 Drawing Sheet

(51) Int. Cl.
*G10K 11/178* (2006.01)
*B62D 5/04* (2006.01)
*H02P 29/50* (2016.01)

(52) U.S. Cl.
CPC ......... *B62D 5/0472* (2013.01); *B62D 5/0481* (2013.01); *G10K 11/178* (2013.01); *G10K 11/17825* (2018.01); *G10K 11/17883* (2018.01); *H02P 29/50* (2016.02); *G10K 2210/129* (2013.01); *G10K 2210/1282* (2013.01); *G10K 2210/3044* (2013.01); *G10K 2210/501* (2013.01)

(58) Field of Classification Search
CPC ..... G10K 2210/1282; G10K 2210/501; G10K 2210/129; G10K 2210/3044; B62D 5/0463; B62D 5/0472; B62D 5/0481
USPC ............. 381/71.4, 71.1, 71.2, 71.7, 73.1, 86
See application file for complete search history.

(56) References Cited

U.S. PATENT DOCUMENTS

| | | | | |
|---|---|---|---|---|
| 8,424,904 | B2* | 4/2013 | Cech ................... | B60R 11/0247 |
| | | | | 280/728.3 |
| 9,042,570 | B2* | 5/2015 | Sakamoto ............ | G10K 11/175 |
| | | | | 381/71.4 |
| 2018/0370563 | A1* | 12/2018 | Schaenzel ............ | B62D 5/0481 |

FOREIGN PATENT DOCUMENTS

| | | |
|---|---|---|
| DE | 100 52 275 A1 | 5/2002 |
| DE | 10 2005 051 442 A1 | 5/2007 |
| DE | 10 2009 056 784 A1 | 6/2011 |
| DE | 10 2011 011 823 A1 | 9/2012 |
| DE | 20 2014 101 708 U1 | 11/2014 |
| DE | 10 2014 110 446 A1 | 1/2015 |
| DE | 10 2014 007 502 A1 | 11/2015 |
| WO | 2014/016723 A2 | 1/2014 |

\* cited by examiner

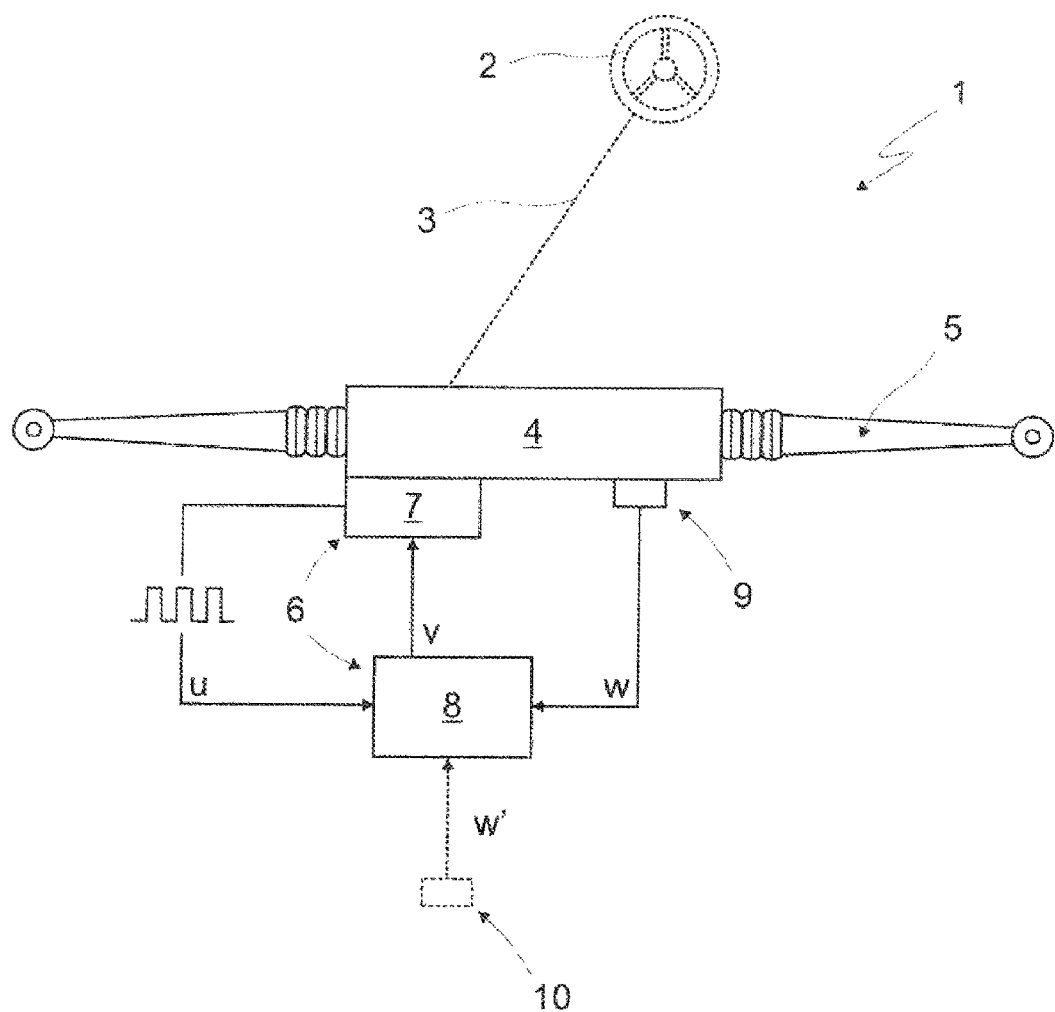

METHOD FOR MASKING AND/OR REDUCING DISTURBING NOISES OR THE CONSPICUOUSNESS THEREOF DURING OPERATION OF A MOTOR VEHICLE

This application is a 35 U.S.C. § 371 National Stage Application of PCT/EP2016/079367, filed on Dec. 1, 2016, which claims the benefit of priority to Serial No. DE 10 2015 122 194.2, filed on Dec. 18, 2015 in Germany, the disclosures of which are incorporated herein by reference in their entirety.

The disclosure relates to a method for masking and/or reducing disturbing noises or the conspicuousness thereof when a motor vehicle is being operated. The disclosure also relates to a motor vehicle having an actuator for mechanically adjusting, manipulating and/or deforming objects. The disclosure relates furthermore to a computer program.

BACKGROUND

When actuators or motors are being operated in motor vehicles, in particular when electrical steering systems or electronic servo-assisted steering devices or electrically adjustable steering columns are being operated, it is possible for disturbing noises to be produced by diverse components of the actuator system. Disturbing noises of this type may be produced by way of example by an electric servo drive or its electric motor, a toothed belt, a ball screw drive, etc. These noises may also be determined by the arrangements, in other words the frequency of the noise changes with the rotational speed of the electric motor and depends upon the design of the components (pole pair number, number of the windings of the rotor of the electric motor, teeth number of a motor pinion, etc.). The noises are in particular frequently characterized by individual, in particular conspicuous, frequencies or arrangements.

Above all, individual (tonal) noises are perceived by humans as being particularly disturbing even though such individual frequencies are in principle unavoidable in the actuator systems of motor vehicles, in particular in electrical steering systems. Conventional methods for reducing noise are frequently limited by having to observe other technical requirements and cost considerations.

Furthermore, the acoustic behavior of assemblies in a motor vehicle is subjected to a notable production series deviation. The acoustic behavior of the assemblies is therefore not known in the individual case and it is also not possible to ascertain any noise change occurring as the service life increases, since a corresponding sensor system is not available. In addition, improper use (misuse) may also produce mechanical changes in an assembly in such a manner that disturbing noises that frequently result in customer complaints or field complaints occur after the misuse event. This applies in particular when steering systems and electrically adjustable steering columns are used.

SUMMARY

It follows from this that the object of the disclosure is to reduce and/or mask conspicuous or disturbing noises or the conspicuousness thereof when the motor vehicle is being operated.

This object is achieved in accordance with the disclosure by means of a method for masking and/or reducing disturbing noises or the conspicuousness thereof when a motor vehicle is being operated, wherein, in dependence upon disturbing noises that are detected in acceleration measurement signals that are received or in dependence upon operating states of the motor vehicle or at least of one of the components of the motor vehicle, a compensation signal and/or a heterodyne signal is/are formed, said compensation signal and/or heterodyne signal being used to modulate an existing control signal of an actuator of the motor vehicle in such a manner that the disturbing noises or the conspicuousness thereof are reduced and/or that the disturbing noises are at least in part masked.

By means of these measures, disturbing or conspicuous noises are reduced and/or masked in an advantageous manner and thus in particular humans no longer perceive such noises as particularly disturbing. It is thus possible to mask out to a considerable extent conspicuous noises in a motor vehicle that occur for example even directly after manufacture or during the course of the service life. As a consequence, it is possible to increase the operating comfort of the motor vehicle. It is possible to influence the sound image of the motor vehicle or at least of a component of the motor vehicle in a purposeful manner in that freely definable frequencies, arrangements or broadband frequency ranges are generated in an amplified or purposeful manner in dependence upon the respective operating state. It is thus possible for example to integrate into the steering system of the motor vehicle a control system that, in order to reduce the conspicuousness of disturbing tonal components, adds further noises to the existing steering system noises in dependence upon the operating state, by way of example the temperature or rotational speed of the electric motor of the servo drive.

It is possible to use as an actuator a component of an electrically adjustable steering column or of an electronic servo-assisted steering device of a motor vehicle, preferably in the form of an electric servo drive, in particular an electric motor. If, by way of example, disturbing noises of the electronic servo-assisted steering device are to be eliminated, it is possible in an advantageous manner to use the actual electric motor of the electric servo drive as an actuator. Consequently, further components are not required but rather a torque ripple is applied accordingly to the control signal available at the electric motor, said control signal being used to reduce the conspicuousness of tonal noise portions. It is therefore possible in order to eradicate the disturbing noises to use the same components that are used to generate said disturbing noises. This embodiment has the advantage that it is not necessary to provide a further component as an actuator, such as for example an electromechanical shaker or the like, in order to reduce and/or mask the conspicuous noises. The solution in accordance with the disclosure is therefore cost-effective. It is possible in accordance with the disclosure to influence a control signal that is available for the electric motor, by way of example of the steering system, with an additional torque ripple that may be used to reduce and/or mask the conspicuous noises.

The disturbing noises may be detected in acceleration measurement signals at least of an acceleration sensor of the motor vehicle, which is preferably arranged on a regulating and/or control device, in particular of an electronic servo-assisted steering device of the motor vehicle, or at least of an external acceleration sensor.

It is possible in accordance with the disclosure to arrange the acceleration sensor in the motor vehicle, in particular in the region of a potential noise source. The installation position may be determined according to the requirements of the specific project. The acceleration sensor may be integrated during the series production, for example in the steering gear of the electronic servo-assisted steering device.

However, the acceleration sensor may also be provided in the region of an electrically adjustable steering column or other components of the motor vehicle, by way of example in the region of the housing of a ball screw drive, an electric motor, a coupling site or the engine control unit. It is thus possible to use the acceleration sensor to detect the disturbing noises directly or in the proximity of the source.

It is also possible in accordance with the disclosure to use the acceleration sensor to implement a quality control inspection during the production procedure (by way of example an end-of-line test) or else to provide the system with information on an individual basis and/or initially regarding reducing and/or masking the conspicuous noises within the scope of the acceptance inspection, wherein, in an advantageous manner, it is not necessary to provide an additional external acceleration sensor on the test bench. However, it is also possible for this purpose to mount an external acceleration sensor (for example a probe or the like) on the test bench. The external acceleration sensor may be configured so as to create a communication connection with the motor vehicle or a regulating and/or control device by way of example via a diagnostic device or the like.

The disturbing or conspicuous noises that are to be detected are in particular noises that are produced by the electronic servo-assisted steering device or noises that are produced by an electrically adjustable steering column. The frequencies of the disturbing noises are in particular in the audible range for humans. Such frequencies may be for example frequencies above 100 Hz to approximately 10,000 Hz.

It is possible to use the measured rotational speed of an electric motor or actuator to generate a tonal signal or a sound signal in a regulating device that may be configured as part of a control device and to further transmit said signal to the actuator as a control signal. The acceleration sensor provides the error signal for the closed-loop control procedure by means of which the control signal is adjusted to suit in each case in order to realize an optimum noise behavior (sound image) for the steering system noises or other noises.

It is further possible in accordance with the disclosure to provide that the disturbing noises are detected in the acceleration measurement signals of the at least one acceleration sensor in that disturbing frequencies are determined with reference to predetermined threshold values or the like.

It is possible to use by way of example test drives as a reference source or to determine the threshold values. The reference data may by way of example be stored in a storage element of a control device in a data field or the like and made available to the system.

It is possible to provide in accordance with the disclosure that the disturbing noises are reduced by virtue of reducing disturbing frequencies in that the compensation signal is influenced by a signal of comparable amplitude and frequencies, preferably anti-phase frequencies, which correspond in a phase-offset manner to the conspicuous frequencies.

Since in particular tonal noises, therefore noises where individual frequencies stand out, are perceived by humans as being in particular disturbing, the described embodiment may produce a considerably optimized sound image. Disturbing noises, by way of example noises from the steering system or the steering column, in particular arrangements of motors and belts, or disturbing frequencies are reduced by virtue of superimposing said noises with an anti-phase signal of comparable amplitude. It is possible for this purpose to use an existing actuator system in an advantageous manner. An existing control signal may be manipulated in such a manner that the existing control signal is modulated by the compensation signal. It is thus possible to use a noise cancellation procedure.

It is also possible to provide in accordance with the disclosure that the disturbing noises are masked or the conspicuousness of the disturbing noises reduced in that the heterodyne signal is influenced by a broadband signal or a tonal signal having predetermined frequencies or arrangements. The broadband signal may preferably be a noise signal.

In order to reduce the extent to which disturbing frequencies or frequency bands stand out or to reduce the conspicuousness thereof to humans, it is possible to modulate an existing control signal of an existing actuator by a broadband signal (in particular a noise signal) that is frequently perceived by a human as not being disturbing. It is also possible to use a broadband signal in that for example specific auxiliary frequencies are raised. It is possible in this case to use principles of psychoacoustics or noise design.

It is possible in accordance with the disclosure to provide a combination of reducing and masking the conspicuous noises. In particular, it is possible to use for this purpose anti-phase frequencies as a form of compensation and a noise signal as a mask. It is possible to take into consideration a rotational speed of the actuator when the compensation signal and/or the heterodyne signal is/are being formed.

The motor vehicle disclosed herein comprises an actuator for mechanically adjusting, manipulating and/or deforming objects, and also an electronic regulating and/or control device, in particular for regulating and/or actuating the actuator that is configured so as to perform a method in accordance with the diclosure.

Moreover, the motor vehicle may be connected in a communicating manner to at least one external acceleration sensor, wherein, in the case of an existing communication connection, the electronic regulating and/or control device receives acceleration measurement signals of the at least one external acceleration sensor as input signals.

Furthermore, it is provided in accordance with the disclosure that the acceleration sensor is fixedly mounted to a test bench within the scope of the acoustics acceptance inspection (end-of-line test) following the production of the motor vehicle or parts of the motor vehicle. An external acceleration sensor of this type may be used in this case in an advantageous manner for implementing a quality control inspection during the production procedure or else to provide the system with information on an individual basis and/or initially regarding reducing and/or masking the conspicuous noises within the scope of the acceptance inspection.

Moreover, the motor vehicle may comprise at least one acceleration sensor, wherein the electronic regulating and/or control device receives the acceleration measurement signals of the at least one acceleration sensor as input signals.

It is possible to provide in accordance with the disclosure at least one acceleration sensor, wherein it is possible, particularly when the motor vehicle is being operated, to detect disturbing or conspicuous noises in the measurement signals of the at least one acceleration sensor, and the electronic regulating and/or control device is provided so as to evaluate the measurement signals and/or the conspicuous noises and to actuate the actuator accordingly.

It is advantageous if the acceleration sensor is arranged in the motor vehicle, in particular in the region of a potential noise source. The installation position may be determined according to the requirements of the specific project.

It is possible to provide in accordance with the disclosure that the at least one acceleration sensor is arranged in the region of an electronic servo-assisted steering device of the motor vehicle, in particular in the region of a steering gear, on the electric servo drive, in particular on the electric motor, or on the electronic regulating and/or control device. The acceleration sensor may be integrated during the series production, above all in the steering gear. However, the acceleration sensor may also be provided in the region of an electrically adjustable steering column or other components of the motor vehicle, by way of example in the region of the housing of a ball screw drive, electric motor, a coupling site or an engine control unit.

The installation position of the at least one acceleration sensor may be determined according to the specific requirements. The closer the acceleration sensor is to the components that generate the noises, the more accurate the detection of the conspicuous noises and the extent to which said noises are subsequently reduced and/or masked.

It is possible to provide in accordance with the disclosure that the acceleration sensor is arranged in the region of the electronic regulating and/or control device, in particular the electronic servo-assisted steering device, or directly on the engine control unit or directly on the regulating and/or control device or its circuit boards/printed circuit boards or other control units, since as a result it is possible in an advantageous manner to maintain short cable lengths.

It is possible to provide in accordance with the disclosure that the at least one acceleration sensor is configured in a piezoelectrical, microelectromechanical or capacitive manner. The acceleration sensor may be configured as a miniature acceleration sensor. The at least one acceleration sensor may also be configured as a microsystem or MEMS ("Micro Electro Mechanical System").

It is possible to integrate in a simple manner an acceleration sensor of this type or acceleration recorders during the series production in particular into the steering gear or the electrically adjustable steering column.

It is possible in accordance with the disclosure for the at least one acceleration sensor, in particular a miniature acceleration sensor, to comprise a weight of <1 g and/or a receiving range of 20 Hz to 6,000 Hz and/or a measurement range of +/−0.01867 m/s$^2$ to +/−5000 m/s$^2$. Furthermore, the acceleration sensor may be configured in a one-dimensional manner and/or have a linearity up to 11 kHz. The weight of an acceleration sensor of this type may be by way of example 0.28 g.

It is possible to provide in accordance with the disclosure that the actuator is configured as a component of an electric servo-assisted steering device, preferably in the form of an electric servo drive, in particular as an electric motor. It is also possible to provide in accordance with the disclosure that the actuator is configured as a component of an electrically adjustable steering column, in particular as an electric motor.

The method in accordance with the disclosure for masking and/or reducing disturbing noises or the conspicuousness thereof when a motor vehicle is being operated is preferably realized as a computer program on one control device or distributed on multiple regulating and/or control devices of the motor vehicle or the electronic servo-assisted steering device or the electrically adjustable steering column, wherein other solutions are also naturally possible. It is possible for this purpose to store the computer program in a storage element of the at least one regulating and/or control device. The method is performed by virtue of a processing procedure on a microprocessor of the control device. The computer program may be stored as a computer program product on a computer-readable data carrier (diskette, CD, DVD, hard drive, USB memory stick, SD card or the like) or on an internet server and transferred from there into the storage element of the regulating and/or control device. A computer program of this type is disclosed herein.

BRIEF DESCRIPTION OF THE DRAWING

Advantageous embodiments and further embodiments of the disclosure are set forth. One exemplary embodiment of the disclosure is described in principle below with reference to the drawing.

The single FIGURE of the drawing illustrates a simplified schematic view of an electronic servo-assisted device.

DETAILED DESCRIPTION

Although the disclosure is described in the following exemplary embodiment with reference to an electronic servo-assisted steering device 1 of a motor vehicle (not illustrated), the disclosure may naturally also be used for any other noise-reducing and/or masking functions in the motor vehicle. By way of example, it is particularly conceivable to use the disclosure in the case of an electrically adjustable steering column.

The FIGURE illustrates the electronic servo-assisted steering device 1 of the motor vehicle (not illustrated). The electronic servo-assisted steering device 1 comprises a steering handle that is configured as a steering wheel 2 and indicated by the broken line. The steering wheel 2 is connected to a steering gear 4 via an articulated shaft or steering column 3 (likewise indicated by the broken line). The steering gear 4 is used so as to convert a rotational angle of the steering column 3 into a wheel steering angle of the steerable wheels (not illustrated) of the motor vehicle.

The steering gear 4 comprises a toothed rod 5 that is illustrated in a simplified manner and a pinion (not illustrated) that is engaged by the steering column 3. A steering wheel angle is predetermined by means of the steering wheel 2 as a measurement for a desired wheel steering angle of the steerable wheels of the motor vehicle. The input angle of the steering gear 4 is the pinion angle in the illustrated exemplary embodiment. Furthermore, the electronic servo-assisted device 1 comprises an electric servo drive 6 that is used inter alia to provide the variable torque support. The electric servo drive 6 comprises an electric motor 7 as an actuator for mechanically adjusting, manipulating and/or deforming objects so as to realize the torque support via a belt drive (not illustrated). The belt drive comprises a drive pinion and a belt disk for transmitting the torque support via a planetary ball gear or a ball screw drive (not illustrated) to the toothed rod 5 of the electronic servo-assisted device 1. Furthermore, an electronic regulating and/or control device 8 is provided for actuating or regulating the electric motor 7. The disclosure is described with reference to an electronic servo-assisted device 1 (EPS—Electric Power Steering) having a belt drive and a separate planetary ball gear for transmitting the supporting force to the toothed rod 5, such as is known by way of example from DE 100 52 275 A1. It is possible to realize identical implementations in accordance with the disclosure for further electrical servo-assisted steering system technologies that have torque or steering support, in particular by way of example AFS (Active Front Steering) or steer by wire.

As is apparent from the FIGURE, the electronic regulating and/or control device 8 actuates the electric motor 7 by means of a control signal v and receives a rotational speed signal u as an input signal from the electric motor 7.

The electronic servo-assisted steering device 1 comprises in accordance with the disclosure at least one acceleration sensor 9 that is electrically connected or connected in a communicating manner to the electronic regulating and/or control device 8. Consequently, error signals or measurement signals w of the acceleration sensor 9 are transmitted as input signals to the electronic regulating and/or control device 8. Disturbing noises may be detected in the measurement signals w of the at least one acceleration sensor 9 in particular when the motor vehicle is being operated.

The at least one acceleration sensor 9 may be configured in a piezoelectrical, microelectromechanical or capacitive manner.

The at least one acceleration sensor 9 may comprise a weight of <1 g and/or a receiving range of 20 Hz to 6000 Hz and/or a measurement range of +/−0.0187 $m/s^2$ to +/−5000 $m/s^2$. The acceleration sensor 9 is arranged in the region of the electronic servo-assisted steering device 1 or in the region of the steering gear 4. It is possible in further exemplary embodiments (not illustrated) to arrange the acceleration sensor 9 on a housing of the ball screw drive of the steering gear 4, on the electric servo drive 6, in particular on the electric motor 7 or preferably directly on the electronic regulating and/or control device 8 or its circuit board/printed circuit board. In the event that the acceleration sensor 9 is arranged directly on the electronic regulating and/or control device 8, the cable lengths are correspondingly short.

The electronic regulating and/or control device 8 is configured as a computer program so as to perform a method in accordance with the disclosure for masking and/or reducing disturbing noises or the conspicuousness thereof when the motor vehicle that comprises the electronic servo-assisted steering device 1 is being operated. The method in accordance with the disclosure may also be performed in a distributed manner on further control devices (not illustrated). Furthermore, it is possible in further exemplary embodiments (not illustrated) to perform the method on a higher-level control device or system and to actuate the electronic regulating and/or control device accordingly.

It is possible to run the method in accordance with the disclosure on the regulating and/or control device 8 so as to mask and/or reduce disturbing noises or the conspicuousness thereof when the motor vehicle is being operated, wherein a compensation signal and/or a heterodyne signal is/are formed in dependence upon disturbing noises that are detected in the acceleration measurement signals w that are received or in dependence upon operating states of the motor vehicle or upon the electronic servo-assisted device 1 as a component of the motor vehicle, said signals being used to modulate an existing control signal v of the electric motor 7 as an actuator of the motor vehicle in such a manner that the disturbing noises or the conspicuousness thereof are reduced and/or that the disturbing noises are at least in part masked.

It is possible in further exemplary embodiments (not illustrated) to also use a component of an electrically adjustable steering column of the motor vehicle as an actuator.

The disturbing noises may be detected in the acceleration measurement signals w, w' of the acceleration sensor 9 of the motor vehicle or alternatively or in addition thereto at least of an external acceleration sensor 10 that is indicated by the broken line. The motor vehicle or the electronic regulating and/or control device 8 may be connected in a communicating manner to the external acceleration sensor 10, wherein, in the case of an existing communication connection, the electronic regulating and/or control device 8 receives acceleration measurement signals w' of the at least one external acceleration sensor 10 as input signals.

It is possible, depending upon the operating state, by way of example temperature or rotational speed of the electric motor 7 of the servo drive 6, to add further noises to the existing steering system noises in order to reduce the conspicuousness of disturbing tonal components.

A disturbing noise may be detected in the measurement signals or acceleration measurement signals w of the at least one acceleration sensor 9 in that conspicuous frequencies are determined with reference to predetermined threshold values or the like.

It is possible to reduce disturbing noises by means of reducing disturbing frequencies in that the compensation signal is influenced by a signal of comparable amplitude and frequencies, preferably anti-phase frequencies, which correspond in a phase-offset manner to the disturbing frequencies.

It is possible to mask disturbing noises or reduce the conspicuousness of the disturbing noises in that the heterodyne signal is influenced with a broadband signal or a tonal signal with predetermined frequencies or arrangements. A noise signal is used as a broadband signal.

A rotational speed, i.e. the rotational speed signal u of the electric motor 7, is taken into consideration when the compensation signal and/or the heterodyne signal is/are being formed.

It is thus possible to provide, within the electrical steering system or the electronic servo-assisted steering device 1, a control system that comprises the following components: (a) (miniature) acceleration sensor 9 integrated in the steering system, (b) controller (ECU) or electronic regulating and/or control device 8 and (c) electric motor 7 as an actuator.

(a) The acceleration sensor 9 is integrated during the series production in the steering gear 4. According to requirements of the specific project, the installation position may be for example in the region of a housing of a ball screw drive (not further illustrated) or of an electric motor 7 or of a coupling site or of the electronic regulating and/or control device 8 or of the ECU (Electronic Control Unit). The acceleration sensor 9 provides the operating behavior for the closed-loop control procedure and may also be used to implement the quality control inspection during the production process.

(b) It is possible using the measured rotational speed signal u of the electric motor 7 to generate a damper signal or a sound signal in the electronic regulating and/or control device 8 and to further transmit said signal to the electric motor 7 as a control signal. The acceleration sensor 9 of (a) delivers the error signal or the measurement signal w for the closed-loop control procedure, by means of which the control signal v is adjusted in each case, in order to reduce the steering system noises in an optimum manner or to realize an optimum noise behavior (sound image) for the steering system noises.

(c) It is not necessary to provide a further component, such as for example an electromechanical shaker or the like, as an actuator, but rather so to speak a torque ripple corresponding to the available control signal v is applied to the electric motor 7 of the electronic servo-assisted steering device 1 and this is used to reduce the disturbing frequencies and/or arrangements or the conspicuousness of tonal noise portions.

LIST OF REFERENCE NUMERALS

1 Electronic servo-assisted steering device
2 Steering wheel

3 Steering column
4 Steering gear
5 Toothed rod
6 Electric servo drive
7 Electric motor
8 Electronic regulating and/or control device
9 Acceleration sensor
10 External acceleration sensor
u Rotational speed signal
v Control signal
w,w' Acceleration measurement signal

The invention claimed is:

1. A method for masking disturbing noises or disturbing frequencies of the disturbing noises when a motor vehicle is being operated, the method comprising:
    forming at least one of a compensation signal and a heterodyne signal based on the disturbing noises that are detected in acceleration measurement signals that are received or based on operating states of the motor vehicle or of a component of the motor vehicle;
    using the at least one of the compensation signal and the heterodyne signal to modulate an existing control signal of an actuator of the motor vehicle such that the disturbing noises or the disturbing frequencies are masked; and
    influencing the at least one of the compensation signal and the heterodyne signal with a broadband signal or a tonal signal having predetermined frequencies or arrangements, such that the disturbing noises or the disturbing frequencies are masked,
    wherein the actuator is a component of an electrically adjustable steering column or an electronic servo-assisted steering device of the motor vehicle, and
    wherein the disturbing noises and the disturbing frequencies are those that are produced by the electronic servo-assisted steering device or the electrically adjustable steering column when the motor vehicle is being operated.

2. The method as claimed in claim 1, wherein the electronic servo-assisted steering device of the motor vehicle includes an electric servo drive.

3. The method as claimed in claim 1, further comprising:
    detecting the disturbing noises in the acceleration measurement signals at least of an acceleration sensor of the motor vehicle,
    wherein the acceleration sensor is arranged on a control device of the electronic servo-assisted steering device of the motor vehicle.

4. The method as claimed in claim 1, further comprising:
    detecting the disturbing noises in the acceleration measurement signals; and
    determining the disturbing frequencies using predetermined threshold values.

5. The method as claimed in claim 1, further comprising:
    masking the disturbing noises by reducing the disturbing frequencies,
    wherein the at least one of the compensation signal and the heterodyne signal is influenced by another signal of comparable amplitude and frequencies, and
    wherein frequencies of the other signal correspond in a phase-offset manner to the disturbing frequencies.

6. The method as claimed in claim 1, wherein a noise signal is used as the broadband signal.

7. The method as claimed in claim 1, further comprising:
    using a rotational speed of the actuator when forming the at least one of the compensation signal and the heterodyne signal.

8. The method as claimed claim 1, wherein a computer program having program code is configured to perform the method when the program code is implemented on a microprocessor of a computer.

9. A motor vehicle, comprising:
    an actuator configured to at least one of mechanically adjust, manipulate, and deform objects, the actuator being further configured to:
        form at least one of a compensation signal and a heterodyne signal based on disturbing noises that are detected in acceleration measurement signals that are received or based on operating states of the motor vehicle or of a component of the motor vehicle;
        use the at least one of the compensation signal and the heterodyne signal to modulate an existing control signal of an actuator of the motor vehicle such that the disturbing noises or disturbing frequencies of the disturbing noises are masked; and
        influence the at least one of the compensation signal and the heterodyne signal with a broadband signal or a tonal signal having predetermined frequencies or arrangements, such that the disturbing noises or the disturbing frequencies are masked; and
    an electronic control device configured to at least one of regulate and actuate the actuator,
    wherein the actuator is a component of an electrically adjustable steering column or an electronic servo-assisted steering device of the motor vehicle, and
    wherein the disturbing noises and the disturbing frequencies are those that are produced by the electronic servo-assisted steering device or the electrically adjustable steering column when the motor vehicle is being operated.

10. The motor vehicle as claimed in claim 9, wherein the motor vehicle is configured for connection in a communicating manner to at least one external acceleration sensor such that in a case of an existing communication connection, the electronic control device of the motor vehicle receives acceleration measurement signals from the at least one external acceleration sensor as input signals.

11. The motor vehicle as claimed in claim 9, further comprising:
    at least one acceleration sensor,
    wherein the electronic control device is configured to receive the acceleration measurement signals from the at least one acceleration sensor as input signals.

12. The motor vehicle as claimed in claim 9, wherein the actuator is an electric servo drive of the electrically adjustable steering column or the electronic servo-assisted steering device of the motor vehicle.

13. The motor vehicle as claimed in claim 10, wherein the at least one external acceleration sensor is configured as a piezoelectrical, microelectromechanical, or capacitive sensor.

14. The motor vehicle as claimed in claim 10, wherein the at least one external acceleration sensor includes at least one of a weight of <1 g, a receiving range of 20 Hz to 6,000 Hz, and a measurement range of +/−0.0187 m/s$^2$ to +/−5000 m/s$^2$.

15. The motor vehicle as claimed in claim 11, wherein the at least one acceleration sensor is arranged in a region of a steering gear of the electronic servo-assisted steering device.

* * * * *